(12) United States Patent
Dale et al.

(10) Patent No.: US 12,247,463 B2
(45) Date of Patent: Mar. 11, 2025

(54) SUBSEA FLUID INJECTION SYSTEM

(71) Applicant: OneSubsea IP UK Limited, London (GB)

(72) Inventors: Helge Dale, Sandsli (NO); Anders Brunvold, Sandsli (NO)

(73) Assignee: ONESUBSEA IP UK LIMITED, London (GB)

( * ) Notice: Subject to any disclaimer, the term of this patent is extended or adjusted under 35 U.S.C. 154(b) by 0 days.

(21) Appl. No.: 18/261,634

(22) PCT Filed: Jan. 17, 2022

(86) PCT No.: PCT/US2022/012667
§ 371 (c)(1),
(2) Date: Jul. 14, 2023

(87) PCT Pub. No.: WO2022/155568
PCT Pub. Date: Jul. 21, 2022

(65) Prior Publication Data
US 2024/0309736 A1    Sep. 19, 2024

Related U.S. Application Data

(60) Provisional application No. 63/139,379, filed on Jan. 20, 2021, provisional application No. 63/137,782, filed on Jan. 15, 2021.

(51) Int. Cl.
*E21B 43/017*    (2006.01)
*E21B 43/20*    (2006.01)
*E21B 43/36*    (2006.01)

(52) U.S. Cl.
CPC ............ *E21B 43/017* (2013.01); *E21B 43/20* (2013.01); *E21B 43/36* (2013.01)

(58) Field of Classification Search
CPC ......... E21B 43/017; E21B 43/20; E21B 43/36
See application file for complete search history.

(56) References Cited

U.S. PATENT DOCUMENTS 3,413,404 A    11/1968    Macfadyen
4,185,704 A    1/1980    Nixon, Jr.
(Continued)

FOREIGN PATENT DOCUMENTS

AU    6318099 A    6/2001
CN    102701504 A    10/2012
(Continued)

OTHER PUBLICATIONS

Office Action issued in U.S. Appl. No. 17/574,246 dated Apr. 23, 2024, 40 pages.
(Continued)

*Primary Examiner* — Matthew R Buck
(74) *Attorney, Agent, or Firm* — Jeffrey D. Frantz

(57) ABSTRACT

A subsea injection system may include one or more filter stages to filter seawater and output filtered seawater and waste seawater. The waste seawater may include particles removed from the filtered seawater. The subsea injection system may also include a combined pump having an injection pump to motivate the filtered seawater into a reservoir of a geological formation. The combined pump may also include a filter pump to motivate the seawater through the filter stages and a motor to drive the injection pump and the filter pump. The motor may drive the filter pump via an indirect coupling such that the motor is sealed from the filter pump at the indirect coupling.

15 Claims, 8 Drawing Sheets

(56) References Cited

U.S. PATENT DOCUMENTS

| | | | |
|---|---|---|---|
| 4,198,191 | A | 4/1980 | Pierce |
| 6,109,372 | A | 8/2000 | Dorel |
| 6,171,483 | B1 | 1/2001 | Eden |
| 6,318,481 | B1 | 11/2001 | Schoeffler |
| 6,626,254 | B1 | 9/2003 | Krueger |
| 7,569,097 | B2 | 8/2009 | Campen |
| 7,731,843 | B2 | 6/2010 | Pinchin |
| 8,393,876 | B2 | 3/2013 | Sloteman |
| 8,487,493 | B2 | 7/2013 | Cunningham |
| 9,062,542 | B2 | 6/2015 | Sahni |
| 9,206,819 | B2 | 12/2015 | Maier |
| 9,464,516 | B2 | 10/2016 | Ayirala |
| 9,470,080 | B2 | 10/2016 | Kommepalli |
| 9,583,988 | B2 | 2/2017 | Hansen |
| 9,954,414 | B2 | 4/2018 | Cunningham |
| 9,964,113 | B2 * | 5/2018 | Westberg ............. F04D 13/023 |
| 10,160,662 | B2 * | 12/2018 | Grimstad ............ B01D 61/027 |
| 10,370,272 | B2 | 8/2019 | Knox-Holmes |
| 10,859,084 | B2 | 12/2020 | Valland |
| 2001/0011591 | A1 | 8/2001 | Van-Drentham Susman |
| 2002/0088648 | A1 | 7/2002 | Krueger |
| 2003/0145991 | A1 | 8/2003 | Olsen |
| 2005/0023222 | A1 | 2/2005 | Baillie |
| 2005/0029192 | A1 | 2/2005 | Arnold |
| 2005/0112003 | A1 | 5/2005 | Jones et al. |
| 2006/0243670 | A1 | 11/2006 | Pinchin |
| 2007/0090039 | A1 | 4/2007 | Young |
| 2009/0057223 | A1 | 3/2009 | Young |
| 2009/0217992 | A1 | 9/2009 | Wilson |
| 2010/0129237 | A1 | 5/2010 | Eide |
| 2011/0040485 | A1 | 2/2011 | Ong |
| 2011/0052432 | A1 | 3/2011 | Cunningham et al. |
| 2012/0107051 | A1 | 5/2012 | Sweeney et al. |
| 2012/0205307 | A1 | 8/2012 | Boudinar |
| 2013/0195618 | A1 | 8/2013 | Kleynhans et al. |
| 2014/0205475 | A1 | 7/2014 | Dale |
| 2014/0241907 | A1 | 8/2014 | Grynning |
| 2016/0304371 | A1 | 10/2016 | Wang |
| 2016/0368800 | A1 * | 12/2016 | Eriksen ................... E21B 43/01 |
| 2017/0261004 | A1 | 9/2017 | Hofstad |
| 2017/0267545 | A1 | 9/2017 | Grimstad |
| 2017/0298755 | A1 | 10/2017 | Mizukami |
| 2017/0306733 | A1 | 10/2017 | Reeves |
| 2017/0306966 | A1 * | 10/2017 | Valland ................. F04D 29/041 |
| 2018/0038388 | A1 | 2/2018 | Mizukami |
| 2018/0038515 | A1 | 2/2018 | Dixon |
| 2018/0194658 | A1 * | 7/2018 | Plasencia ................ C02F 1/307 |
| 2018/0216448 | A1 | 8/2018 | Bittencourt |
| 2019/0169968 | A1 | 6/2019 | Kanstad et al. |
| 2020/0224519 | A1 | 7/2020 | Kleemeier et al. |
| 2022/0003091 | A1 | 1/2022 | Kjellnes |
| 2022/0136636 | A1 | 5/2022 | Kjellnes |
| 2022/0252070 | A1 | 8/2022 | Brunvold |
| 2022/0252071 | A1 | 8/2022 | Brunvold |

FOREIGN PATENT DOCUMENTS

| | | |
|---|---|---|
| EP | 0562147 A1 | 9/1993 |
| EP | 0594418 A1 | 4/1994 |
| EP | 0770760 A1 | 5/1997 |
| EP | 877895 B1 | 4/2003 |
| EP | 986692 B1 | 1/2006 |
| EP | 3730795 A1 | 10/2020 |
| NO | 20150956 A1 | 1/2017 |
| WO | 9834003 A1 | 8/1998 |
| WO | 0028188 A1 | 5/2000 |
| WO | 2011053752 A1 | 5/2011 |
| WO | 2012121605 A1 | 9/2012 |
| WO | 2012163996 A2 | 12/2012 |
| WO | 2014206919 A1 | 12/2014 |
| WO | 2015103017 A1 | 7/2015 |
| WO | 2015123736 A1 | 8/2015 |
| WO | 2015138898 A1 | 9/2015 |
| WO | 2016189397 A1 | 12/2016 |
| WO | 2017013027 A1 | 1/2017 |
| WO | 2017157860 A1 | 9/2017 |
| WO | 2017186448 A1 | 11/2017 |
| WO | 2018077527 A1 | 5/2018 |

OTHER PUBLICATIONS

Office Action issued in U.S. Appl. No. 17/171,305 dated Feb. 16, 2024, 18 pages.

Stover et al., "Barrier Fluidless, Sealless Seawater Canned Motor Pumps", OTC-29473-MS, Offshore Technology Conference, May 2019, 11 pages.

Hermetic canned motor pumps acc. to API 685, Lederle Hermetic, available at: https://www.hermetic-pumpen.com/en/api-685, 3 pages.

Feldle, "Canned motor pumps in compliance with API 685—A contribution to environmental protection", Technical Report, Lederle Hermetic, 13 pages. Available at: https://www.hermetic-pumpen.com/_Resources/Persistent/8b2405ffbe4cfaeb9cb81470b3b8140800e34723/Fachbericht_Spaltrohrmotorpumpen_API_685_EN.pdf.

International Search Report and Written Opinion dated Jun. 26, 2017 for International Application No. PCT/EP2017/055859.

Search Report and Written Opinion issued in International Patent Application No. PCT/US2022/015762 dated May 19, 2022, 10 pages.

Office Action issued in U.S. Appl. No. 17/366,312 dated Jun. 8, 2022, 22 pages.

Office Action issued in U.S. Appl. No. 17/171,305 dated Jan. 17, 2023, 33 pages.

Office Action issued in U.S. Appl. No. 17/353,718 dated Apr. 26, 2023, 35 pages.

Office Action issued in U.S. Appl. No. 17/171,305 dated Jul. 5, 2023, 12 pages.

Search Report and Written Opinion issued in the PCT Application No. PCT/US2022/012667 dated Apr. 25, 2022, 11 pages.

International Preliminary Report on Patentability issued in the PCT Application No. PCT/US2022/015762 dated Aug. 24, 2023, 6 pages.

International Preliminary Report on Patentability issued in the PCT Application No. PCT/US2022/012667 dated Jul. 27, 2023, 8 pages.

Office Action issued in U.S. Appl. No. 17/171,305 dated Aug. 26, 2024, 18 pages.

* cited by examiner

SUBSEA FLUID INJECTION SYSTEM

CROSS-REFERENCE TO RELATED APPLICATION

This application is a national stage entry under 35 U.S.C. 371 of International Application No. PCT/US2022/012667, entitled "SUBSEA FLUID INJECTION SYSTEM," filed Jan. 17, 2022, which is claiming priority to and the benefit of U.S. Provisional Application No. 63/137,782, entitled "SUBSEA FLUID INJECTION SYSTEM," filed Jan. 15, 2021, and U.S. Provisional Application No. 63/139,379, entitled "SUBSEA FLUID INJECTION SYSTEM," filed Jan. 20, 2021, both of which are hereby incorporated by reference in their entirety for all purposes.

BACKGROUND

The present disclosure generally relates to subsea systems and methods for injecting fluid into a subterranean formation.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Hydrocarbon fluids, such as oil and natural gas, are obtained from subterranean or subsea geologic formations, referred to as reservoirs, by drilling one or more wells that penetrates the hydrocarbon-bearing geologic formation. In subsea applications, various types of infrastructure may be positioned along a sea floor to aid in retrieving the hydrocarbon fluids. For example, hydrocarbon recovery may be enhanced by fluid injection systems that pump fluid (e.g., water) into the reservoir to maintain and/or increase pressure within the reservoir, thereby maintaining or increasing the hydrocarbon fluid pressure at production wells. As such, by maintaining or increasing the pressure within the reservoir, a rate of extraction of the hydrocarbon fluids may be maintained or increased.

In some scenarios, the injected fluid may be treated (e.g., filtered or otherwise processed) prior to being pumped into the reservoir. Moreover, motors may drive pumps that move the fluid through one or more filters (e.g., for treatment) and subsequently inject the fluid into the reservoir. In some scenarios, a barrier fluid may be used to protect and/or cool the motor and act as a lubricant for internal components, such as bearings and mechanical seals. The barrier fluid may be pressurized to a higher level than the pumped/processed fluid, such that the barrier fluid serves to form a "barrier" between the process fluid and other areas of the pump, such as the motor. Due to the higher pressure, there may be a consumption, or "leakage," of barrier fluid into the process fluid across the mechanical seals of the pump. However, it may be desired to reduce or eliminate barrier fluid leakage into the process fluid.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a subsea injection system may include one or more filter stages to filter seawater and output filtered seawater and waste seawater. The waste seawater may include particles removed from the filtered seawater. The subsea injection system may also include a combined pump having an injection pump to motivate the filtered seawater into a reservoir of a geological formation. The combined pump may also include a filter pump to motivate the seawater through the filter stages and a motor to drive the injection pump and the filter pump. The motor may drive the filter pump via an indirect coupling such that the motor is sealed from the filter pump at the indirect coupling.

In another embodiment, a combined pump may include a filter pump to motivate seawater through one or more filter stages to generate filtered seawater and an injection pump to motivate the filtered seawater into a reservoir of a geological formation. Additionally, the combined pump may include a motor to drive the injection pump and the filter pump. The motor may drive the filter pump via an indirect coupling such that the motor is sealed from the filter pump at the indirect coupling.

In another embodiment, a method may include driving, via an electric motor, a filter pump and an injection pump. The electric motor may drive the filter pump via an indirect coupling such that the electric motor is sealed from the filter pump at the indirect coupling. The method may also include pumping, via the filter pump, seawater from an environment through one or more filter stages that output filtered seawater and waste seawater. The method may also include pumping, via the injection pump, the filtered seawater into a reservoir of a geological formation and expelling the waste seawater back to the environment.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
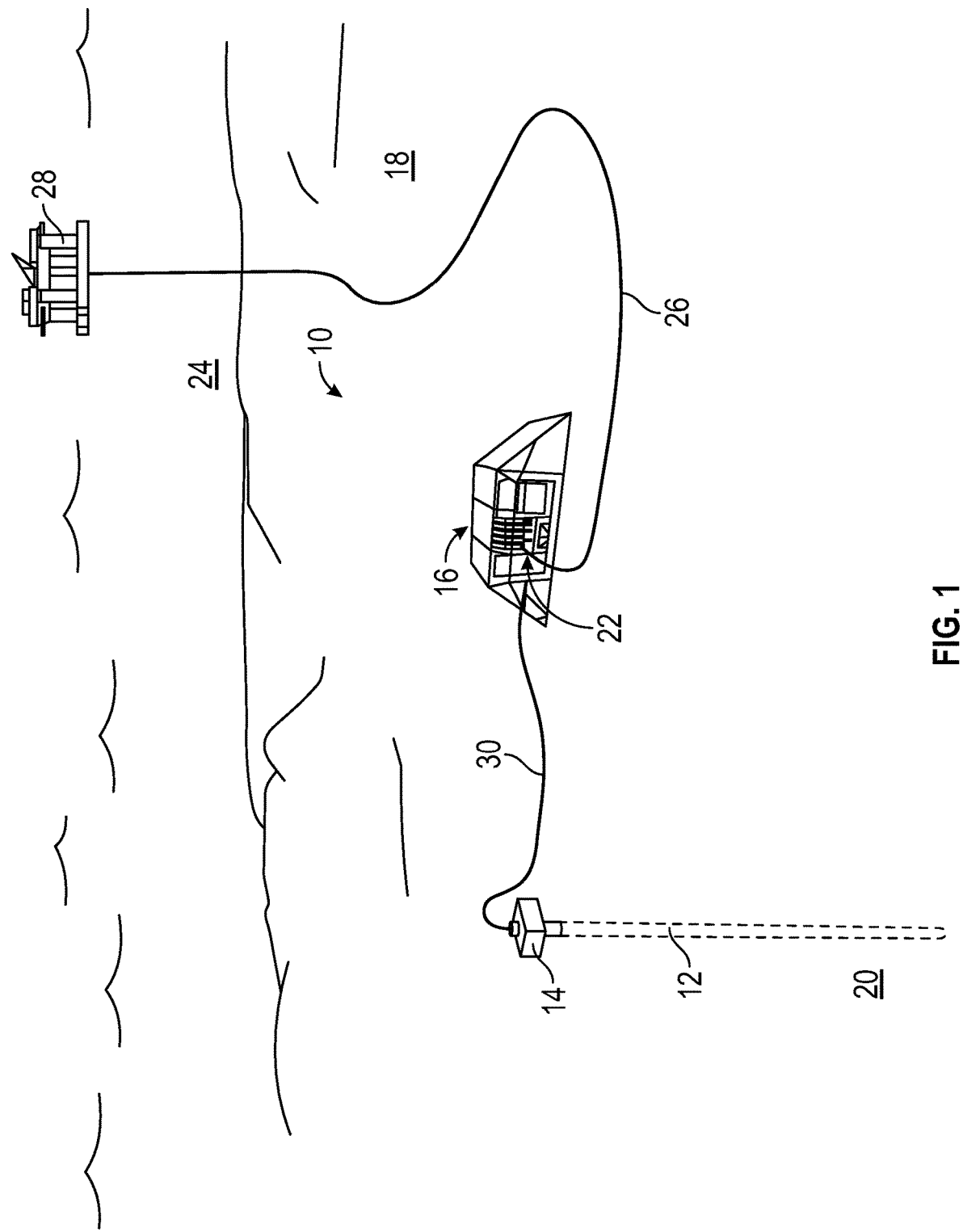
FIG. 1 a schematic view of a subsea injection system including an injection well, a wellhead, and a subsea station, according to embodiments of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection (e.g., where the connection may not include or include intermediate or intervening components between those coupled), and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Hydrocarbon fluids, such as oil and natural gas, may be obtained from subterranean or subsea geologic formations, referred to as reservoirs, by drilling one or more wells that penetrates the hydrocarbon-bearing geologic formation. In subsea applications, various types of infrastructure may be positioned along a sea floor to aid in retrieving the hydrocarbon fluids. In some embodiments, hydrocarbon recovery may be enhanced by fluid injection systems that pump fluid (e.g., water) into the reservoir to maintain and/or increase pressure within the reservoir, thereby maintaining or increasing the hydrocarbon fluid pressure at production wells. As such, by maintaining or increasing the pressure within the reservoir, a rate of extraction of the hydrocarbon fluids may be maintained or increased.

In some embodiments, and particularly in subsea applications, an abundance of seawater may provide easy and convenient access to fluid for injection. However, prior to injecting seawater or another fluid into the reservoir, the fluid may be treated (e.g., filtered or otherwise processed) prior to being pumped into the reservoir. For example, it may be desirable to remove sulfates or other contaminates from the fluid prior to injection into the reservoir to, among other reasons, reduce a risk of crystallization of sulfates in the reservoir, which may affect hydrocarbon production.

In some embodiments, separate pumps may be utilized for facilitating filtering the fluid (i.e., a filter pump) and injecting the fluid (i.e., injection pump) into the reservoir. The pumps may be driven by one or more motors (e.g., electric motors) to pump the fluid through one or more filters (e.g., for treatment) and facilitate injection of the fluid into the reservoir. However, additional motors may increase cost of manufacture, implementation (e.g., installation), and utilization (e.g., electricity usage) of the subsea injection system. As such, in some disclosed embodiments, a single motor may drive both the filter pump and the injection pump.

Furthermore, in some scenarios, a barrier fluid may be used to protect and/or cool the motor and act as a lubricant in internal components, such as bearings and mechanical seals (e.g., seals between the motor and one or more pumps). The barrier fluid may be pressurized to a higher level than the pumped/process fluid such that the barrier fluid serves to form a "barrier" between the process fluid and other areas of the pump, such as the motor. Due to the higher pressure, there may be a consumption, or "leakage," of barrier fluid into the process fluid across mechanical seals of the pump/motor assembly.

In some scenarios, it may be desired to reduce or eliminate barrier fluid in the process fluid. For example, as the fluid (e.g., seawater) is treated via the filters, barrier fluid may negatively affect the effectiveness of the filters (e.g., by clogging or damaging filter membranes). Additionally, wastewater from the treatment process may be expelled to the environment, and it may be desirable to minimize or eliminate the expulsion of barrier fluid to the environment. As such, in some embodiments, the filter pump may be driven via an indirect (e.g., electromagnetic) coupling to the motor, such that there is no barrier fluid crossover to the process fluid and, therefore, no barrier fluid expelled to the environment. For example, the filter pump may be mechanically and/or fluidly isolated from the motor, but still driven via an electromagnetic coupling. Moreover, in some embodiments, a single electric motor may directly or indirectly drive the injection pump while also indirectly (e.g., via an electromagnetic coupling) driving the filter pump to allow for a simplified, cost- and energy-efficient filter and injection system that reduces or eliminates barrier fluid in the wastewater to the seawater environment.

With the foregoing in mind, FIG. 1 is a schematic view of a subsea injection system 10 including an injection well 12, a wellhead 14, and a subsea station 16, according to embodiments of the present disclosure. The subsea station 16 and wellhead 14 are generally disposed on the seafloor 18, and the injection well 12 may penetrate the seafloor 18 and extend into a reservoir 20. The subsea station 16 may include one or more pumps, motors (e.g., electric motors), and/or a controller 22 to pressurize seawater 24 for injection into the reservoir 20. By injecting the seawater 24 or other fluid into the reservoir 20, the pressure within the reservoir 20 may be maintained or increased to facilitate extraction of hydrocarbons from the reservoir 20 at a production well (not shown). In some embodiments, the subsea station 16 may be connected to an umbilical 26, which may supply fluids (e.g., barrier fluids, injection fluids, etc.), power, control signals, etc., to the subsea station 16. In some embodiments, the umbilical 26 may connect the subsea station 16 to a platform 28 on the surface of the seawater 24. As should be appreciated, the umbilical 26 may connect the subsea station 16 to other facilities such as a floating production, storage and offloading unit (FPSO), a shore-based facility, or other subsea systems. Furthermore, the subsea station 16 may be coupled to the wellhead 14 via pipes 30 (e.g., high pressure pipes) for injecting pressurized fluid (e.g., seawater 24) into the reservoir 20. Moreover, in some embodiments, the pumps and motors of the subsea injection system 10 may be implemented on the platform 28 or otherwise on the surface, and the pipes may bring the pressurized seawater 24 to the wellhead 14 from the surface.

Although a single injection well 12 and subsea station 16 are shown in FIG. 1, as should be appreciated, the subsea injection system 10 may include multiple subsea stations 16 and/or injection wells 12. For example, in some embodiments, a subsea station 16 may pressurize seawater 24 for injection into multiple (e.g., two, three, four, and so on) different injection wells 12. In such embodiments, the controller 22 may regulate valves of the subsea station 16 to direct pressurized injection fluid into the multiple injection wells 12 individually or simultaneously.

As stated above, by injecting fluid into the reservoir 20, the pressure within the reservoir 20 may be maintained or increased to facilitate hydrocarbon extraction. For example, the removal of hydrocarbons from the reservoir 20 (e.g., via a production well) may decrease the pressure within the reservoir 20, which, in turn, may reduce the rate of hydrocarbon extraction. As such, by pressurizing (e.g., increasing or maintaining the pressure of) the reservoir with other (e.g., non-reservoir) fluids (e.g., seawater 24), the rate of hydrocarbon extraction may be maintained or increased.

Figure 2:
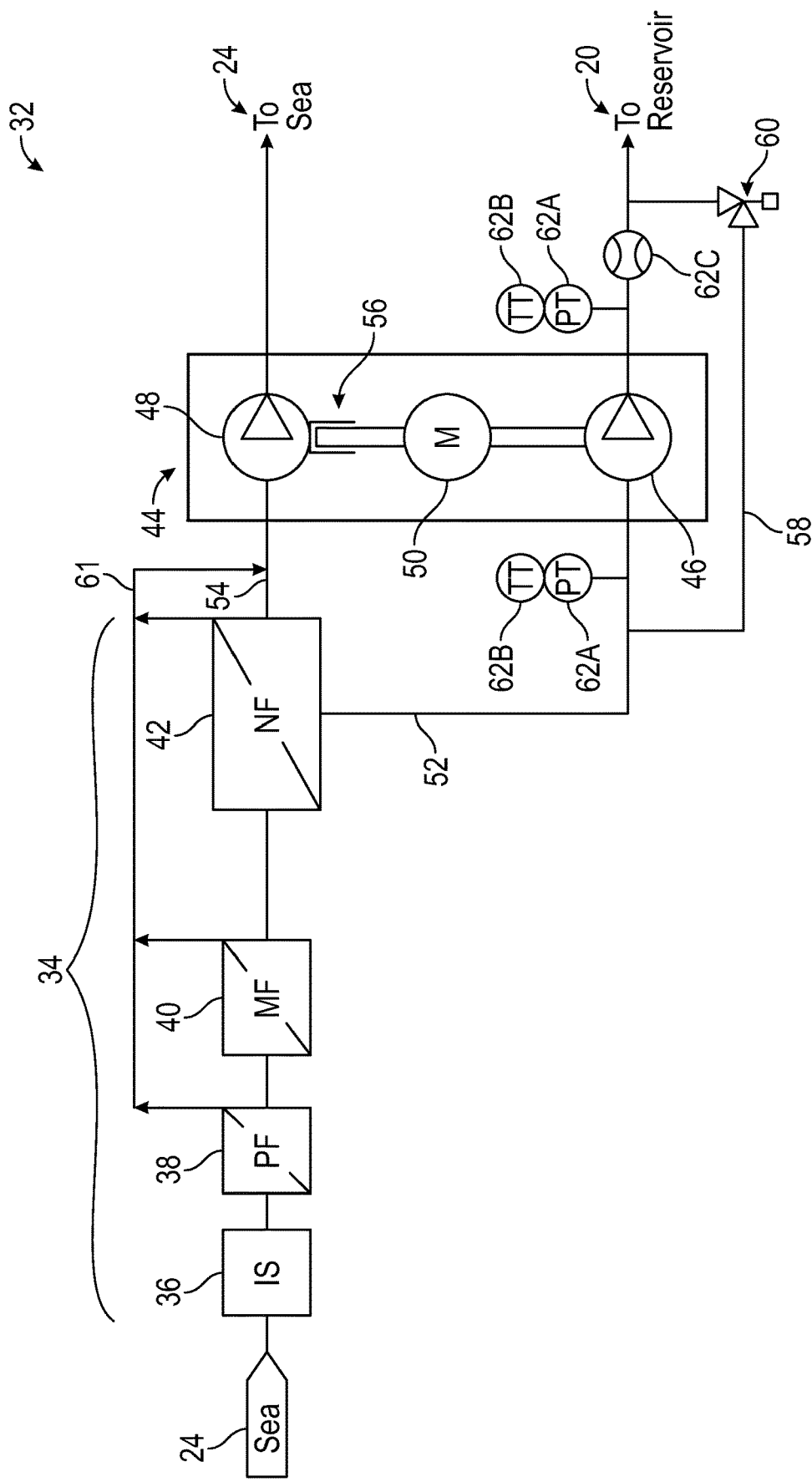
FIG. 2 is a schematic diagram of a portion of the subsea injection system of FIG. 1 including a combined pump, according to embodiments of the present disclosure.

As seawater 24 is readily available in the subsea environment, seawater 24 may be utilized as an injection fluid. However, seawater 24 may include impurities such as particles, algae, oxygen and/or sulfates. As such, treatment (e.g., filtration) of the seawater 24 may be performed prior to injection into the reservoir 20. FIG. 2 is a schematic diagram of a portion 32 of the subsea injection system 10, which may be included in the subsea station 16, according to embodiments of the present disclosure. To treat the seawater 24 prior to injection, one or more filter stages 34. For example, the filter stages 34 may include an inlet strainer 36, a particle filter 38, a micro-filter 40, and/or a nano-filter 42 as described in U.S. Pat. No. 10,160,662, which is incorporated herein by reference.

In some embodiments, the inlet strainer 36 prevents large objects, such as fish, rocks, and/or waterborne debris, from proceeding to the particle filter 38. The particle filter 38 may prevent small objects, such as mud and sand, from proceeding to the micro-filter 40, and the micro-filter 40 may filter particles larger than 0.1 micron, 1 micron, 10 microns, and so on, from the seawater 24, depending on implementation. In some embodiments, the nano-filter 42 may filter sulfates and/or dissolved salt from the seawater 24. By removing sulfates, a likelihood of crystallization of the sulfates and/or scaling in the reservoir 20 (which may lead to decreased hydrocarbon production) may be reduced. As should be appreciated, the filter stages 34 described above are given as examples and, as such, are non-limiting. Fewer or additional filter stages 34 may be included depending on implementation.

To motivate the flow of seawater 24 through the filter stages 34 and into the reservoir 20, a combined pump 44 may be utilized having at least one injection pump 46 and at least one filter pump 48. The combined pump 44 may use a single motor 50 to drive both the injection pump 46 and the filter pump 48. The motor 50 may be any suitable type of motor (e.g., electric motor) capable of adequately operating both the injection pump 46 and the filter pump 48. For example, the motor 50 may be a permanent magnet motor, a canned stator motor, or a barrier fluid-less motor.

In some embodiments, the nano-filter 42 may output a permeation flow 52 and a rejection flow 54. The permeation flow 52 may be a portion of seawater 24 that has been treated by the filter stages 34 and may proceed to the injection pump 46 for injection into the reservoir 20. On the other hand, the rejection flow 54 may include the sulfates and/or salts filtered from the input seawater 24 that are to be returned to the environmental seawater 24. As stated above, the filter stages 34 are given as examples, and the permeation flow 52 and rejection flow 54 of the nano-filter 42 are likewise given as examples of filtered flows and waste flows, respectively. The filter pump 48 may be driven by the motor 50 to facilitate the rejection flow 54 to the environmental. However, as stated above, motors directly coupled (e.g., physically coupled, such as by using physical components, including gears, shafts, couplings, and the like) to a pump may leak barrier fluid into the process flow. In some embodiments, to avoid barrier fluid in the rejection flow 54 returning to the sea 24, the filter pump 48 may be mechanically and fluidly sealed (e.g., hermetically sealed) from the motor 50. In the absence of a mechanical coupling between the filter pump 48 and the motor 50, the filter pump 48 may be driven via an indirect coupling 56 (e.g., without physical coupling), such as an electromagnetic coupling.

In some embodiments, the same motor 50 that indirectly drives the filter pump 48 may also drive, directly or indirectly, the injection pump 46. The injection pump 46 may pressurize the permeation flow 52 for injection into the reservoir 20. In some embodiments, the permeation flow 52 may also include a recirculation flow 58, for example, to facilitate flow regulation via one or more valves 60 and/or to prevent overpressurization or cavitation. For example, in some scenarios, the injection pump 46 may cavitate if the flowrate through the injection pump 46 is below a threshold rate. Using the recirculation flow 58, the flowrate may through the injection pump 46 may be increased. Furthermore, in some embodiments, the flowrates of the filter pump 48 and the injection pump 46 may be about the same (e.g., within 10 percent, within 5 percent, within 1 percent, and so on) or based on a set ratio depending on the permeation flow 52 and rejection flow 54 characteristics of the nano-filter 42 and/or the backpressure of the reservoir 20.

Additionally, in some embodiments, one or more of the filter stages 34 (e.g., the particle filter 38, the micro-filter 40, and/or the nano-filter 42) may be coupled to a backwash flowline 61 to flush or otherwise clean the filter stages 34 of the filtered contaminants/debris. For example, the filter stages 34 may include one or more valves to direct the incoming seawater 24 in a reversed flow (relative to the flow of normal operation) through the filter stages 34 such that the previously filtered contaminants/debris is flushed though the backwash flowline 61. In some embodiments, the filter pump 48 and/or one or more ejector pumps (not shown) may motivate the flow through the backwash flowline 61. Additionally, the backwash operation, including valve regulation, may be monitored (e.g., via one or more sensors within or near the filter stages 34) and/or controlled by the controller 22.

In some embodiments, the controller 22 may include one or more processors and memory to facilitate operation of the subsea injection system 10. For example, the controller 22 may receive information from one or more sensors 62 (e.g., pressure sensor(s) 62A, temperature sensor(s) 62B, flow sensor(s) 62C, and/or other sensors) and regulate operation of the valve(s) 60, filter pump 48, injection pump 46, and/or motor 50. Moreover, while discussed above as being disposed at the subsea station 16, the controller 22 may be implemented at the platform 28 or any other suitable location for controlling operations of the subsea injection system 10. As should be appreciated, the processor(s) may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. Moreover, the processor may be implemented as one of multiple processors that work in conjunction with each other to perform the various functions described herein. Furthermore, the processor may be operably coupled with the memory to execute various algorithms stored in the memory to perform the functions described herein. The memory may include any suitable non-transitory medium for storing data and executable instructions, such as random-access memory, read-only memory, rewritable flash memory, hard drives, and optical discs.

Additionally, in some embodiments, desired chemicals may be injected into the subsea injection system 10 at any suitable point (e.g., downstream of one or more filtering stages 34, upstream or downstream of the injection pump 46, etc.) depending on the characteristics of the reservoir 20 and/or the desired water quality. Such chemicals may include, but are not limited, to organic biocide, bio dispersant/surfactant, scale inhibitors, calcium nitrate, oxygen scavenger, surfactant enhanced oil recovery (EOR), polymer inhibitor, and/or microbial EOR.

Figure 3:
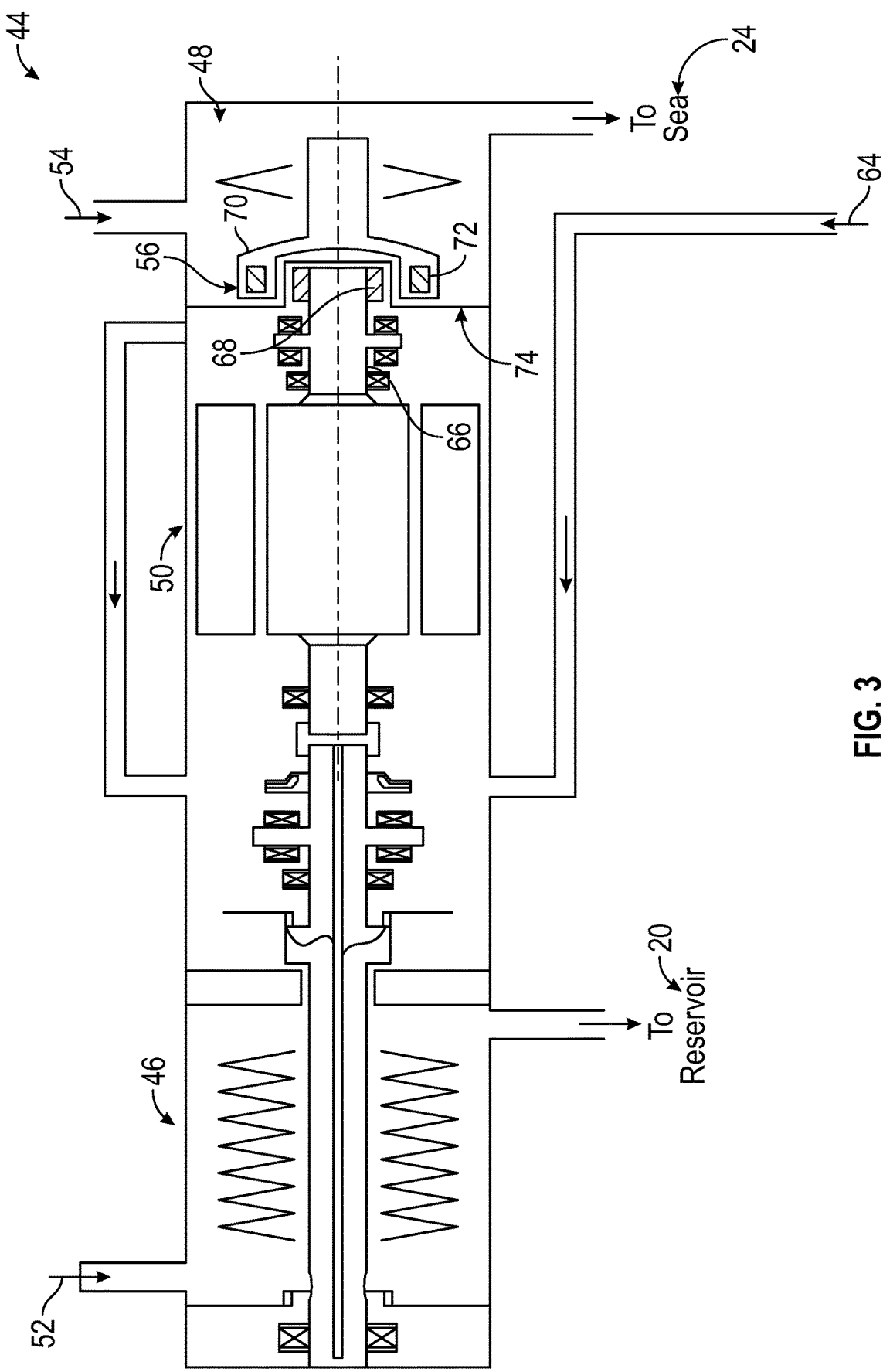
FIG. 3 is a schematic diagram of the combined pump of FIG. 2, according to embodiments of the present disclosure.

FIG. 3 is a schematic diagram of the combined pump 44, according to embodiments of the present disclosure. As stated above, the combined pump 44 includes an injection pump 46, which may be directly (e.g., mechanically coupled) to the motor 50. As used herein, a pump directly coupled to the motor 50 includes a mechanical coupling of the motor shaft 66 and the impellers of the pump. The injection pump 46 may include a single or multistage pump (e.g., 2, 5, 10, or more stages) for pressurizing the permeation flow 52. Additionally, the motor 50 may include a barrier fluid inlet 64 to receive/replenish barrier fluid that may have leaked into the permeation flow 52. In some embodiments, the motor 50 may also drive the filter pump 48 via an indirect coupling 56 (e.g., electromagnetic coupling). For example, the shaft 66 of the motor 50 may have one or more coils 68 disposed thereon, and a rotor 70 of the filter pump 48 may have opposing coils 72 disposed thereon. As the shaft 66 spins, the coils 68 generate an electromagnetic field that induces the rotor 70 to spin, via the opposing coils 72. Furthermore, a seal 74 (e.g., hermetic seal) may be made between the shaft 66 of the motor 50 and the rotor 70 of the filter pump 48 to reduce or eliminate leakage of barrier fluid into the rejection flow 54. As such, the combined pump 44 may drive both the rejection flow 54 and the permeation flow 52 using a single motor 50 without leaking barrier fluid into the rejection flow 54.

In some embodiments, the filter pump 48, injection pump 46, and motor 50 may be housed in a single housing with inlets and outlets for the respective seawater flows. Moreover, in some embodiments, the injection pump 46 and motor 50 may be housed together while the filter pump 48 is separately housed. For example, the seal 74 may formed by the housing of the injection pump 46 and motor 50 and/or by the housing of the filter pump 48.

Figure 4:
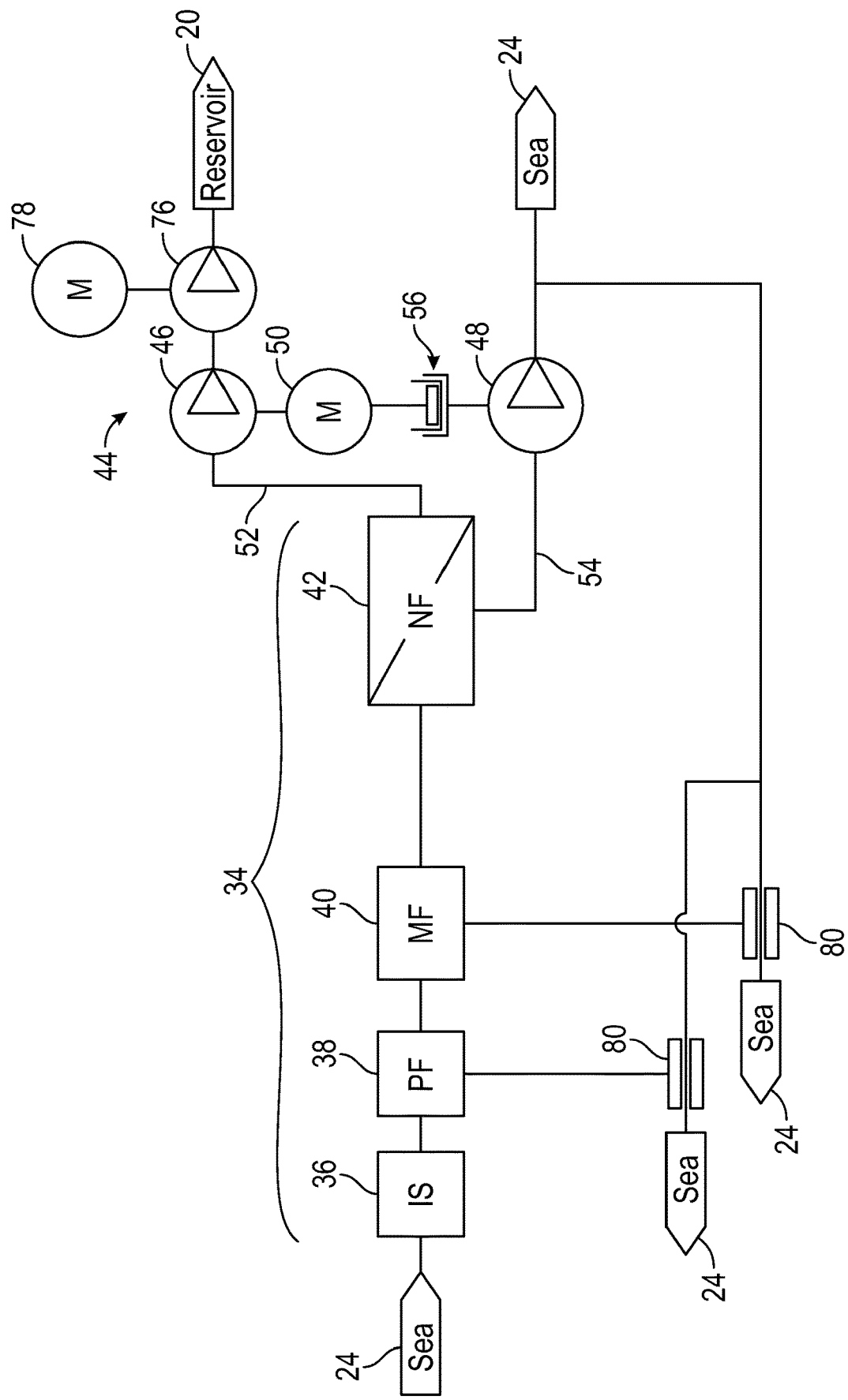
FIG. 4 is a schematic diagram of an example configuration the portion of the subsea injection system of FIG. 2 having an auxiliary injection pump driven by an auxiliary motor, according to embodiments of the present disclosure.

Although the filter pump 48 is shown in FIG. 2 as being disposed downstream or after the nano-filter 42, as should be appreciated, different configurations and/or additional pumps (e.g., additional filter pumps and/or injection pumps) may also be used depending on implementation. For example, FIGS. 4-7 are schematic diagrams of different example configurations of the portion 32 of the subsea injection system 10, according to embodiments of the present disclosure. For example, the filter pump 48 may be upstream or downstream of the nano-filter 42. Moreover, the filter pump 48 and/or injection pump 46 may run in series or parallel with respective auxiliary pumps. As shown in FIG. 4, an auxiliary injection pump 76 driven by an auxiliary motor 78 may be implemented to further increase the pressure of the permeation flow 52 prior to injection into the reservoir 20. In some scenarios, increased pressure may be needed to counter pressure drops/deficiencies related to the water depth at the seafloor 18, line loss of the pipes 30, and/or other factors.

Moreover, in some embodiments, the rejection flow 54 may be utilized as part of a backwash process and/or to clean the particle filter 38 and/or micro-filter 40 before being expelled to the environmental seawater 24. Additionally or alternatively, the particle filter 38 and/or the micro-filter 40 may be self-cleaning (e.g., backwashed using one or more ejector pumps 80 to expel wastewater back to the sea) to increase a lifespan of the particle filter 38 and/or the micro-filter 40.

Figure 5:
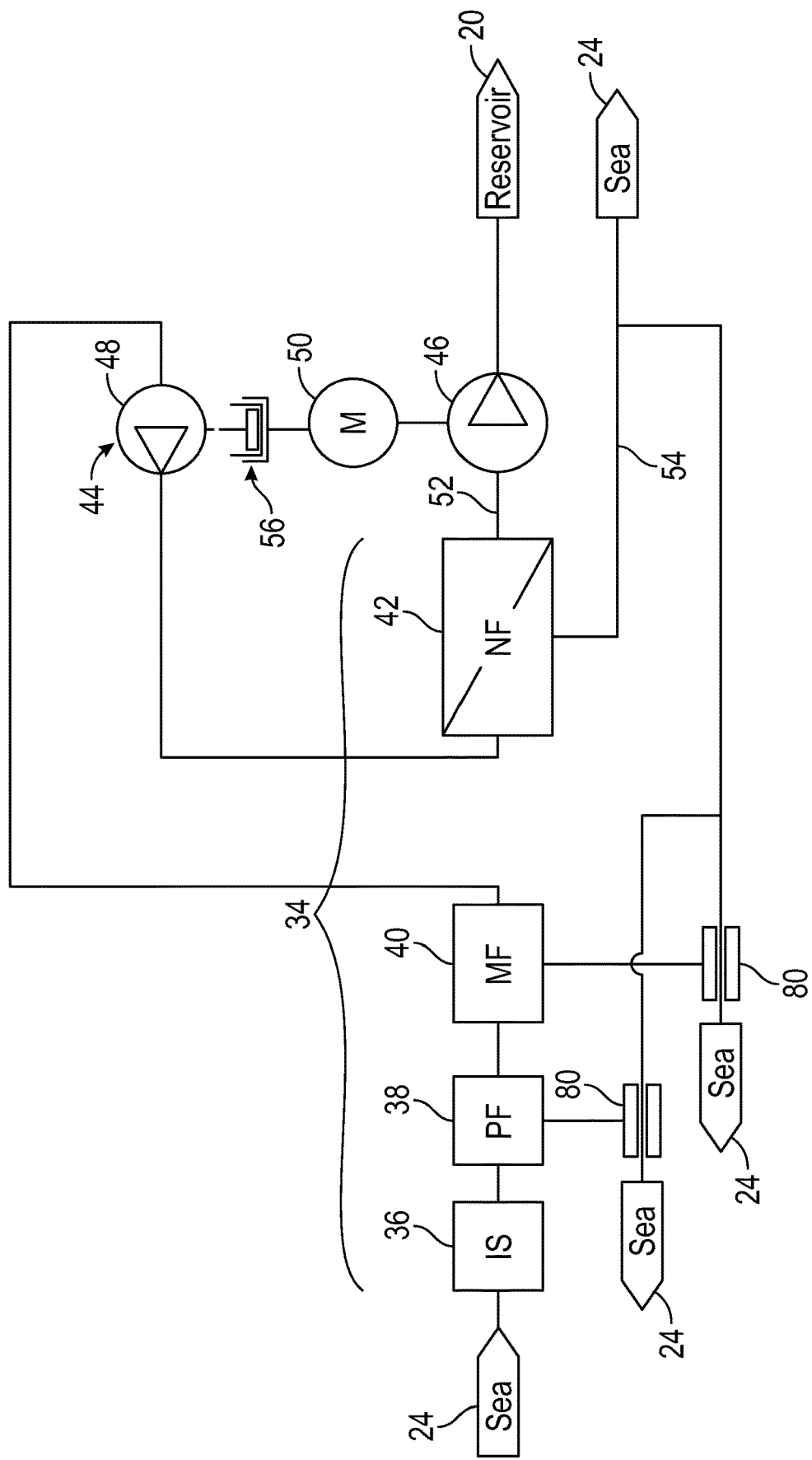
FIG. 5 is a schematic diagram of an example configuration the portion of the subsea injection system of FIG. 2 having a filter pump upstream of a nano-filter, according to embodiments of the present disclosure.

Further, as shown in FIG. 5, the configuration of the filter pump 48 and the nano-filter 42 may be changed such that the filter pump 48 is upstream of the nano-filter 42. As no barrier fluid is leaked into the process flow of the filter pump 48, the seawater 24 entering the nano-filter downstream of the filter pump 48 is also free of barrier fluid, so as to not clog or damage the nano-filter 42. In such an embodiment, the filter pump 48 may receive both filtered and rejected seawater (e.g., as the nano-filter 42 may serve to separate the two), and the indirect coupling 56 and/or filter pump 48 may be increased (e.g., in size) accordingly.

Figure 6:
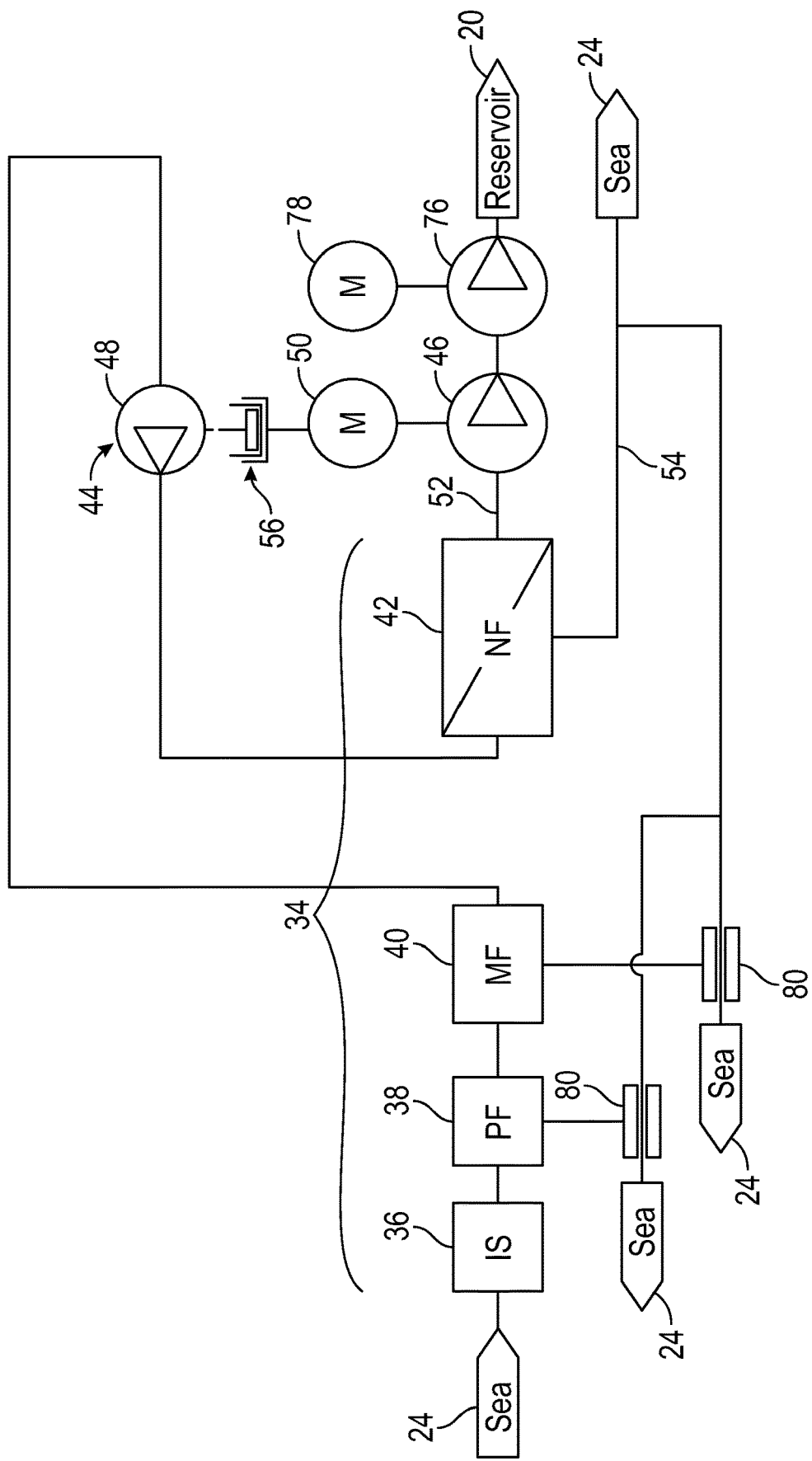
FIG. 6 is a schematic diagram of an example configuration the portion of the subsea injection system of FIG. 2 having multiple injection pumps coupled in series and a filter pump upstream of a nano-filter, according to embodiments of the present disclosure.
Figure 7:
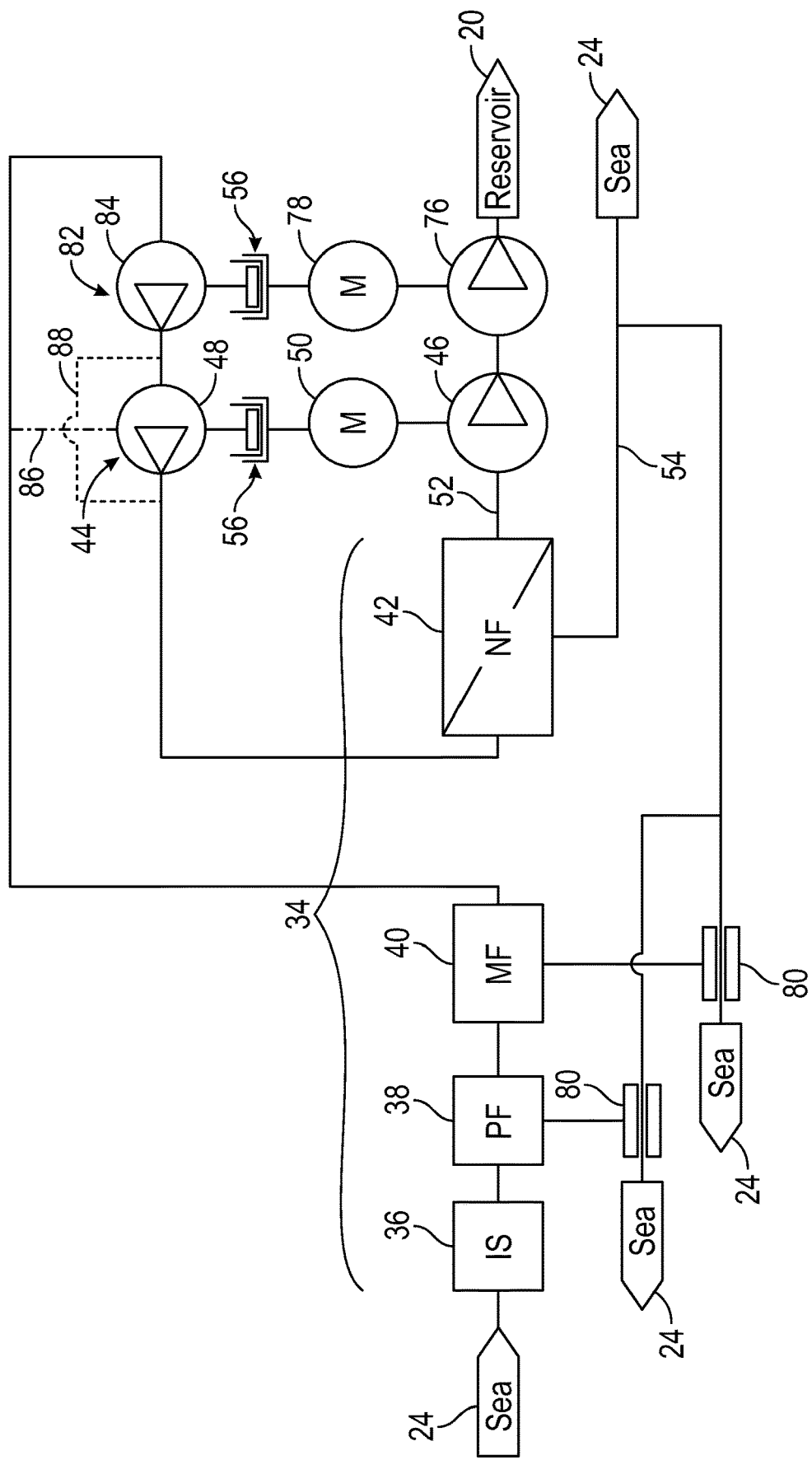
FIG. 7 is a schematic diagram of an example configuration the portion of the subsea injection system of FIG. 2 having multiple combined pumps, according to embodiments of the present disclosure.

Additionally, as shown in FIG. 6, the filter pump 48 may be disposed upstream of the nano-filter 42 and multiple (e.g., two) injection pumps 46 (including auxiliary injection pump 76) (e.g., coupled in series) driven by multiple (e.g., two) respective motors (including auxiliary motor 78) may be implemented to further increase the pressure of the permeation flow 52 prior to injection into the reservoir 20. Furthermore, as shown in FIG. 7, a second combined pump 82 may be implemented having an auxiliary injection pump 76, an auxiliary motor 78, and an auxiliary filter pump 84. As illustrated, the second combined pump 82 may be couple in series with the first combined pump 44. For example, a first injection pump 46 of the first combined pump 44 may be coupled to a second injection pump 76 of the second combined pump 82, while a first filter pump 48 of the first combined pump 44 may be coupled to a second filter pump 84 of the second combined pump 82. Moreover, in some embodiments, the filter pumps (e.g., filter pump 48 and auxiliary filter pump 84) and/or injection pumps (e.g., injection pump 46 and auxiliary injection pump 76) may be implemented in parallel. For example, flow path 86 may allow the filter pump 48 and the auxiliary filter pump 84 to operate in parallel, and the output of the auxiliary filter pump 84 may feed into or circumvent (e.g., via flow path 88) the filter pump 48, depending on implementation. The second combined pump 82 may be implemented to further increase the seawater pressures within the subsea injection system 10 and/or as backups to the combined pump 44.

As should be appreciated, any suitable combination or arrangement of pumps and motors may be used depending on implementation. Furthermore, although discussed herein as being utilized with a motor 50 coupled to the injection pump 46, the filter pump 48 may be indirectly coupled (e.g., electromagnetically coupled) to any suitable motor, which may or may not be coupled, directly or indirectly, to any another pump. Additionally or alternatively, the additional pumps (e.g., auxiliary filter pump 76 and/or auxiliary injection pump 76) may be driven by the single motor 50 of the combined pump 44, such as in a "back-to-back" arrangement, as described in U.S. Pat. No. 10,859,084, which is incorporated herein by reference. For example, the injection pump 46 and auxiliary injection pump 76 may be driven in the back-to-back arrangement, and a shaft (e.g., motor shaft 66 or a shaft of either injection pump driven by the motor shaft 66) may extend beyond the impellers of one or both injection pumps to indirectly couple to one or more filter pumps 48.

Figure 8:
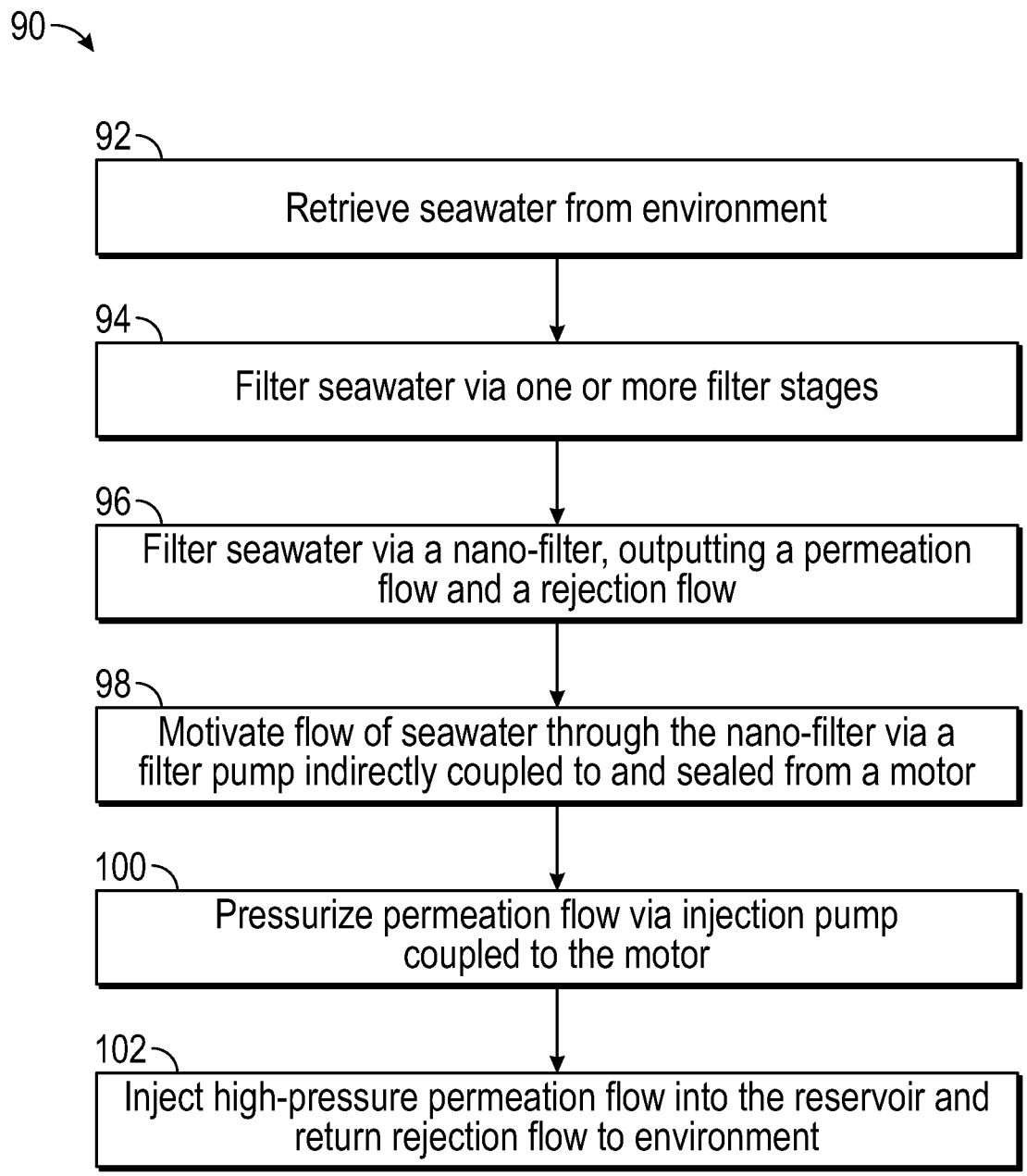
FIG. 8 is a flowchart of an example process utilizing the subsea injection system and combined pump of FIG. 2, according to embodiments of the present disclosure.

FIG. 8 is a flowchart of an example process 90 utilizing the subsea injection system 10 and combined pump 44, according to embodiments of the present disclosure. Seawater 24 may be retrieved from the environment (process block 92) and filtered via one or more filter stages 34 (process block 94). Additionally, the seawater 24 may be filtered by an additional filter stage 34, such as a nano-filter 42, that outputs a permeation flow 52 and a rejection flow 54 (process block 96). The flow of seawater may be motivated through the nano-filter 42 by a filter pump 48 that is indirectly coupled to and sealed from a motor 50 (process block 98). Additionally, the permeation flow 52 may be pressurized by an injection pump coupled (e.g., directly coupled) to the motor 50 (process block 100). The high-pressure permeation flow 52 may be injected into the reservoir 20 and the rejection flow 54 may be returned to the environment (process block 102).

The technical effects of the systems and methods described herein include a subsea injection system 10 with a combined pump 44 that reduces costs and increases efficiencies associated with manufacturing, implementation, and/or maintenance while maintaining a seal (e.g., hermetic seal) between the motor 50 and the rejection flow 54 such that barrier fluid is not expelled to the environment. Furthermore, although the above referenced flowchart is shown in a given order, in certain embodiments, process blocks may be reordered, altered, deleted, and/or occur simultaneously. Additionally, the referenced flowchart is given as an illustrative tool and further decision and process blocks may also be added depending on implementation.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described to best explain the principals of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

What is claimed is:

1. A subsea injection system comprising:
   a plurality of filter stages configured to filter seawater and output filtered seawater and waste seawater, wherein the waste seawater comprises particles removed from the filtered seawater;
   a combined pump fluidly coupled to the plurality of filter stages, the combined pump comprising:
      an injection pump comprising an injection pump inlet, wherein the injection pump is configured to receive the filtered seawater at the injection pump inlet and pump the filtered seawater into a reservoir of a geological formation;
      a filter pump comprising a filter pump inlet, wherein the filter pump is configured to receive the waste seawater at the filter pump inlet and expel the waste seawater; and
      a motor configured to drive the injection pump and the filter pump, wherein the motor is configured to drive the filter pump via an indirect coupling, and wherein the motor is sealed from the filter pump at the indirect coupling; and
   a backwash flow line fluidly coupling a first filter stage of the plurality of filter stages to the filter pump inlet, wherein the backwash flow line bypasses a second filter stage of the plurality of filter stages.

2. The subsea injection system of claim 1, wherein the indirect coupling comprises an electromagnetic coupling.

3. The subsea injection system of claim 1, wherein the plurality of filter stages comprises a nano-filter configured to remove sulfates from the seawater to generate the filtered seawater and expel the sulfates in the waste seawater.

4. The subsea injection system of claim 1, wherein the combined pump is configured to be disposed on a subsea station on a seafloor.

5. The subsea injection system of claim 4, wherein the filter pump is configured to expel the waste seawater to an environment of the subsea station.

6. A combined pump, comprising:
a filter pump comprising a filter pump inlet, wherein the filter pump is configured to receive waste seawater at the filter pump inlet and is configured to expel the waste seawater;
an injection pump comprising an injection pump inlet, wherein the injection pump is configured to receive filtered seawater at the injection pump inlet and is configured to pump the filtered seawater into a reservoir of a geological formation via an injection pump outlet; and
a motor configured to drive the injection pump and the filter pump, wherein the motor is configured to drive the filter pump via an indirect coupling, and wherein the motor is sealed from the filter pump at the indirect coupling, wherein a recirculation flow path fluidly couples the injection pump inlet and the injection pump outlet, and wherein the recirculation flow path allows the filtered seawater to bypass the injection pump.

7. The combined pump of claim 6, wherein the motor comprises an electric motor having a barrier fluid.

8. The combined pump of claim 7, wherein the electric motor is configured to leak at least a portion of the barrier fluid into the filtered seawater at the injection pump and not leak any portion of the barrier fluid into the waste seawater at the filter pump.

9. The combined pump of claim 6, wherein the injection pump is directly coupled to the motor.

10. The combined pump of claim 6, comprising:
a first housing, wherein the injection pump and the motor are disposed in the first housing; and
a second housing, wherein the filter pump is disposed in the second housing, and wherein the motor is sealed from the filter pump via the first housing, the second housing, or both.

11. The combined pump of claim 6, wherein the indirect coupling comprises an electromagnetic coupling.

12. The combined pump of claim 6, wherein the injection pump comprises a multi-stage pump and the filter pump comprises a single stage pump.

13. A method, comprising:
filtering seawater via one or more filter stages to output filtered seawater and waste seawater, wherein the waste seawater comprises particles removed from the filtered seawater;
pumping the filtered seawater and the waste seawater with a combined pump, the combined pump comprising a filter pump and an injection pump, wherein:
the injection pump receives the filtered seawater at an injection pump inlet and pumps the filtered seawater into a reservoir of a geological formation via an injection pump outlet, wherein a recirculation flow path fluidly couples the injection pump inlet and the injection pump outlet and allows the filtered seawater to bypass the injection pump;
the filter pump receives the waste seawater at a filter pump inlet and expels the waste seawater into the sea; and
an electric motor drives the injection pump and drives the filter pump via an indirect coupling, and wherein the electric motor is sealed from the filter pump at the indirect coupling.

14. The method of claim 13, wherein the indirect coupling comprises an electromagnetic coupling, and the electric motor is hermetically sealed from the filter pump at the electromagnetic coupling.

15. The method of claim 13, wherein the electric motor and the combined pump are disposed in a housing.

* * * * *